United States Patent
Hachisuka et al.

(10) Patent No.: US 6,461,579 B1
(45) Date of Patent: Oct. 8, 2002

(54) CATALYST FOR PURIFYING EXHAUST GAS AND EXHAUST GAS PURIFYING METHOD

(75) Inventors: Ichiro Hachisuka, Nagoya; Yasuo Ikeda, Toyota, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/555,384

(22) PCT Filed: Nov. 30, 1998

(86) PCT No.: PCT/JP98/05396

§ 371 (c)(1),
(2), (4) Date: Jul. 21, 2000

(87) PCT Pub. No.: WO99/29417

PCT Pub. Date: Jun. 17, 1999

(30) Foreign Application Priority Data

Dec. 8, 1997 (JP) ............................................. 9-337359
Sep. 17, 1998 (JP) ........................................... 10-263180

(51) Int. Cl.$^7$ .......................... B01D 53/94; B01J 23/40
(52) U.S. Cl. ............................... 423/213.5; 423/239.1; 423/245.3; 423/247; 502/302; 502/303; 502/325; 502/328; 502/339
(58) Field of Search ................................ 502/302, 303, 502/325, 328, 339; 423/213.2, 213.5, 239.1, 245.3, 247

(56) References Cited

U.S. PATENT DOCUMENTS

| | | | | |
|---|---|---|---|---|
| 5,063,192 A | | 11/1991 | Murakami et al. | 502/303 |
| 5,814,576 A | * | 9/1998 | Yamamoto | 502/303 |
| 5,948,376 A | * | 9/1999 | Miyoshi et al. | 423/213.5 |
| 5,948,723 A | * | 9/1999 | Sung | 502/303 |
| 6,004,521 A | * | 12/1999 | Miyoshi et al. | 423/213.5 |
| 6,165,429 A | * | 12/2000 | Ikeda et al. | 423/213.5 |
| 6,180,075 B1 | * | 1/2001 | Lindner et al. | 423/213.5 |
| 6,261,989 B1 | * | 1/2001 | Tanaka et al. | 502/217 |
| 6,294,140 B1 | * | 9/2001 | Mussmann et al. | 423/213.5 |
| 6,355,220 B1 | * | 3/2002 | Blanchard et al. | 423/242.1 |
| 2001/0022956 A1 | * | 9/2001 | Okamoto et al. | 423/213.5 |
| 2001/0031699 A1 | * | 10/2001 | Matsumoto et al. | 502/303 |

FOREIGN PATENT DOCUMENTS

| | | |
|---|---|---|
| EP | 0 305 119 A2 | 3/1989 |
| EP | 0 337 809 A2 | 10/1989 |
| EP | 0 669 157 A1 | 8/1995 |
| EP | 0 707 882 A1 | 4/1996 |
| EP | 0 771 584 A1 | 5/1997 |
| JP | A-5-317625 A | 12/1993 |
| JP | A-10-356 | 1/1998 |

* cited by examiner

*Primary Examiner*—Stanley S. Silverman
*Assistant Examiner*—Timothy C. Vanoy
(74) *Attorney, Agent, or Firm*—Oliff & Berridge, PLC

(57) ABSTRACT

A catalyst for purifying exhaust of an internal combustion engine is prepared by mixing first powders in which at least Pt is loaded on a first support and second powders in which at least Rh is loaded on a second support and loading $NO_x$ occluding material, for example an alkaline-earth metal, alkali metal or rare-earth metal, at least on the first support. In such catalyst, the second support is made of a stabilized zirconia stabilized by alkaline-earth metal or rare-earth element. The second support, having been become alkaline by the alkaline-earth metal or the rare-earth element, is excellent in absorbing performance of the steam ($H_2O$), so that the steam reforming reaction by Rh advances sufficiently. Therefore, the created hydrogen greatly contributes to the reduction of $NO_x$ and to the sulfur poisoning prevention of the $NO_x$ occluding material. Also, the oxidizing ability of Pt is maintained high, Rh sufficiently exhibits the steam reforming reaction activity and the sulfur poisoning of $NO_x$ occluding material is restrained. An exhaust gas from an internal combustion engine is combusted where mixed gas of rich atmosphere containing excessive fuel is supplied to mixed gas of lean atmosphere containing excessive oxygen like a pulse. The exhaust gas is then introduced to the catalyst wherein the exhaust gas is purified.

8 Claims, 9 Drawing Sheets

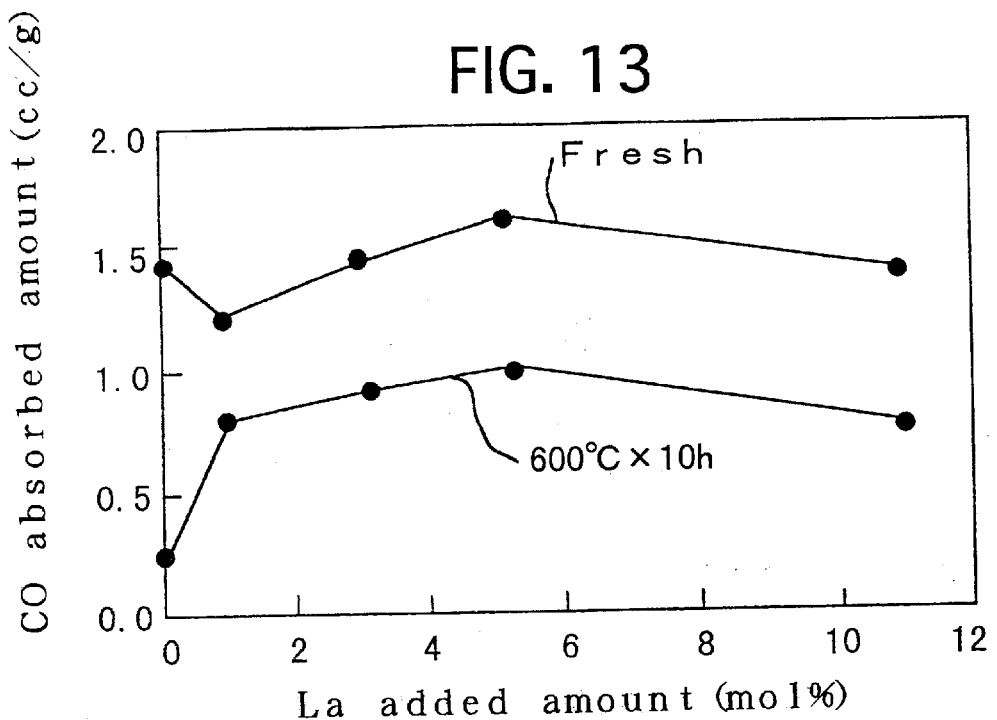
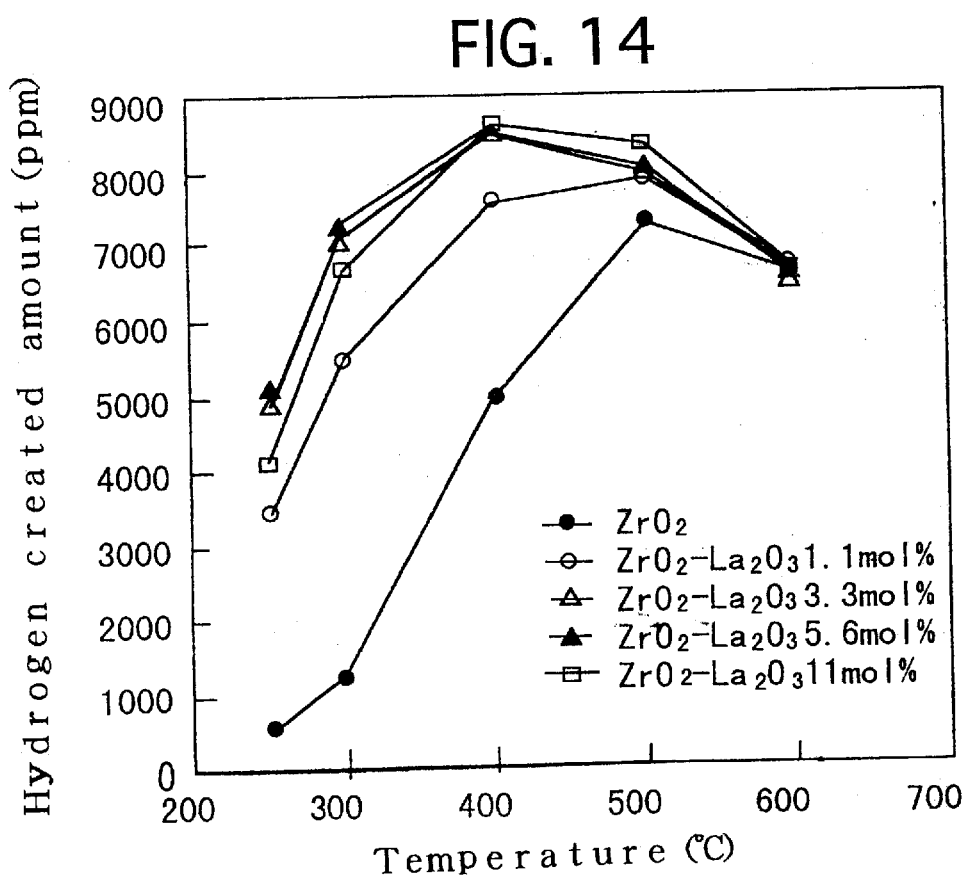

CATALYST FOR PURIFYING EXHAUST GAS AND EXHAUST GAS PURIFYING METHOD

BACKGROUND OF THE INVENTION

1. Field of the Invention

The present invention relates to a catalyst for purifying an exhaust gas discharged from an internal combustion engine of a motor vehicle or the like, and an exhaust gas purifying method using such catalyst. More particularly, it relates to the catalyst and the purifying method capable of efficiently reducing and purifying nitrogen oxides (NOx) contained in the exhaust gas. The exhaust gas contains excess oxygen of amount more than that required for complete oxidation of reduction components such as carbon monoxide (CO), hydrogen ($H_2$) or hydrocarbon (HC).

2. Description of the Related Art

Conventionally, as the catalyst for purifying the exhaust gas of the motor vehicle or the like, a three way catalyst to purify the exhaust gas by oxidizing CO and HC and reducing NOx in the exhaust gas simultaneously in a theoretical air-fuel ratio (stoichmetric) has been used. A well known example of the three way catalyst is composed of a heat-resistant substrate made of cordierite or the like, and a porous support layer made of γ-alumina and formed thereon. The catalyst nobel metals such as platinum (Pt), rhodium (Rh) or the like are loaded on the porous support layer.

On the other hand, recently, in order to protect an earth surrounding environment, carbon dioxide ($CO_2$) contained in the exhaust gas of the internal combustion engine of the motor vehicle or the like has been required to be reduced. As the system capable of meeting this requirement, "lean burn" system in which the fuel is burnt leanly in the excess oxygen contained atmosphere has attracted much attention. With the lean burn system, decreasing the fuel consumption can restrain emission of $CO_2$ generated by burning or combusting the fuel.

On the contrary, the conventional three way catalyst oxidizes or reduces CO, HC or NOx simultaneously to purify the exhaust gas when the air-fuel ratio is in the theoretical air-fuel ratio (stoichimetric), but it does not exhibit sufficient purifying performance for NOx removal by reduction in the excess oxygen contained atmosphere of the exhaust gas in the lean burn system. Under these circumstances, development of both the catalyst and the purifying system capable of efficiently purifying NOx even in the excess oxygen contained atmosphere has been demanded.

The present Applicant have proposed the catalysts for purifying the exhaust gas, in which Pt and alkaline-earth metal such as Barium (Ba) are loaded on a porous support made of alumina or the like (Japanese Patent Laid-open No. 5-317625).

With this catalyst, by controlling the air-fuel ratio from the lean side to the stoichimetric or rich side like a pulse (rich pulse), NOx is occluded in the alkaline-earth metal (NOx occluding material) when the air-fuel ratio is lean, and reacts with reduction components such as HC or CO contained in the exhaust gas to be purified when the air-fuel ratio is stoichimetric or rich. Thus, even in the lean burn system, the NOx can be purified efficiently.

It has been known that the purifying reaction of the NOx by the above catalyst for purifying exhaust gas is comprised of a first step for oxidizing NO contained in the exhaust gas to NOx, a second step for occluding NOx in the NOx-occluding material, and a third step for reducing NOx emitted from the NOx-occluding material -by the HC and CO contained in the exhaust gas on the catalyst.

However, the conventional catalyst for purifying exhaust gas has been suffered from disadvantage that in the lean atmosphere particle growth occurs in Pt to decrease the number of catalyst active points thereof, which decreases the reacting performance in the above first step and the third step.

On the other hand, Rh has been known as the catalyst noble metal hardly suffering from such particle growth in the lean atmosphere, but the oxidizing ability of Rh is inferior to that of Pt. In view of this, using both of Pt and Rh as the catalyst has been studied.

However, when both of Pt and Rh are used, the disadvantage of Rh hindering the oxidizing ability of Pt has clarified. That is, as the added amount of Rh increases, Rh decreases the reacting performance of Pt oxidizing NO to NOx in the first step, and it decreases the NOx occluding ability of the NOx occluding material in the second step. Further, due to bad sympathy of Rh with the NOx occluding material, the co-existence of Rh and the NOx occluding material prevents them from exhibiting the characteristics thereof.

In addition, when the NOx occluding material reacts with sulfur oxides (SOx) such as sulfur oxide ($SO_2$) contained in the exhaust gas to have created the salt, it can not exhibit the NOx occluding function any more. Further, since the formed sulfate or sulfite is not dissolved easily, the NOx occluding material can hardly exhibit the natural NOx occluding function thereof. This is called "sulfur poisoning" which means poisoning of the NOx occluding material by sulfur.

Japanese Patent Laid-open No. 10-356 discloses a catalyst for purifying exhaust gas produced by mixing first powders in which Rh is loaded on alumina or zirconia, and second powders in which Pt and the NOx occluding material are loaded on alumina In this catalyst for purifying exhaust gas, due to the separated loading of Pt from Rh, Pt is restrained from decrease of the oxidizing ability by Rh. Also, Rh and the NOx occluding material being separately loaded do not suffer from the bad mutual sympathy, and can exhibit the characteristics thereof sufficiently.

Furthermore, the separately loaded Rh assists so that HC and $H_2O$ both contained in the exhaust gas create the hydrogen having large reducing force (steam reforming reaction) which contributes reduction of the NOx and separation of the SOx from the sulfate or the sulfite in the NOx occluding material. In this way, the NOx reducing amount in the rich pulse is increased, and the sulfur poisoning of the NOx occluding material is decreased remarkably.

By the way, as the support for loading Rh thereon, using zirconia capable of increasing the steam reforming reaction activity of Rh is preferable. However, the zirconia has smaller heat resistant performance than that of the alumina often used as the support for the noble metal, whereby the specific surface of the support is decreased by heat when the catalyst is used for purifying exhaust gas. As a result, the dispersing performance of the loaded Rh decreases, which results in decrease of the purifying ability thereof.

In addition, due to insufficient increasing operation of the steam reforming reaction activity of Rh by the zirconia, development of the support capable of further increasing the steam reforming reaction activity of Rh has been expected.

The present invention has been made in view of the above circumstances, and has a first object to maintain the oxidizing ability of Pt high by restraining decrease of the oxidizing ability of Pt by Rh.

A second object of the present invention is to cause Rh to exhibit the steam reforming reacting activity sufficiently by using the zirconia as the support.

Further object of the present invention is to restrain the poisoning of the NOx occluding material by the sulfur.

A catalyst for purifying exhaust gas recited in the claim 1 and can overcome the above subject matter is prepared by mixing first powders in which at least platinum (Pt) is loaded on a first support made of porous particles and second powders in which at least Rh is loaded on a second support, and loading NOx occluding material at least on the first support. The catalyst for purifying exhaust gas is featured by that the second support is made of alkaline-earth metal contained zirconia having contained alkaline-earth metal by amount not more than 11.35 mole %.

The catalyst for purifying exhaust gas recited in the claim 3 is featured by that, in the catalyst for purifying exhaust gas recited in the claim 1, the second support is made of the zirconia having contained at least one of elements selected from barium and calcium.

An exhaust gas purifying method recited in the claim 4 is featured by that the exhaust gas discharged from an internal combustion engine in which the fuel is combusted in condition where mixed gas of rich atmosphere containing excessive fuel is supplied to mixed gas of lean atmosphere containing excessive oxygen like a pulse, is purified by a catalyst for purifying exhaust gas. Here, the catalyst for purifying exhaust gas is produced by mixing first powders in which at least Pt is loaded on a first support made of porous particles and second powders in which at least Rh is loaded on a second support made of alkaline-earth metal contained zirconia having contained alkaline-earth metal by amount not more than 11.35 mole %, and loading NOx occluding material at least on the first support.

The exhaust gas purifying method recited in the claim 6 is featured by that, in the exhaust gas purifying method recited in the claim 4, the second support is made of the zirconia having contained at least one of elements selected from barium and calcium.

The catalyst for purifying exhaust gas recited in the claim 7 is prepared by mixing first powders in which at least platinum (Pt) is loaded on a first support made of porous particles and second powders in which at least Rh is loaded on a second support, and loading NOx occluding material at least on the first support. The catalyst is featured by that the second support is made of rare-earth element contained zirconia having contained rare-earth element by amount not more than 11.0 mole %.

The catalyst for purifying exhaust gas recited in the claim 8 is featured by that, in the catalyst for purifying exhaust gas recited in the claim 7, the second support is zirconia having contained lanthanum.

The exhaust gas purifying method recited in the claim 9 for purifying exhaust gas discharged from an internal combustion engine in which fuel is combusted in condition where mixed gas of rich atmosphere containing excessive fuel is supplied to mixed gas of lean atmosphere containing excessive oxygen like a pulse, by a catalyst for purifying exhaust gas prepared by mixing first powders in which at least Pt is loaded on a first support made of porous particles and second powders in which at least Rh is loaded on a second support made of rare-earth element contained zirconia having contained rare-earth element by amount not more than 11.0 mole %, and loading NOx occluding material at least on the first support.

The exhaust gas purifying method recited in the claim 10 is featured by that, in the exhaust gas purifying method recited in the claim 9, the second support is zirconia having contained lanthanum.

BRIEF EXPLANATION OF THE DRAWINGS

FIG. 13 is a graph showing the CO-absorbed amount of the second powders used in the embodiments and the comparative samples.

FIG. 14 is a graph showing the hydrogen created amount of the second powders used in the embodiments and the comparative samples.

BEST MODE FOR CARRYING OUT THE INVENTION

Figure 1:
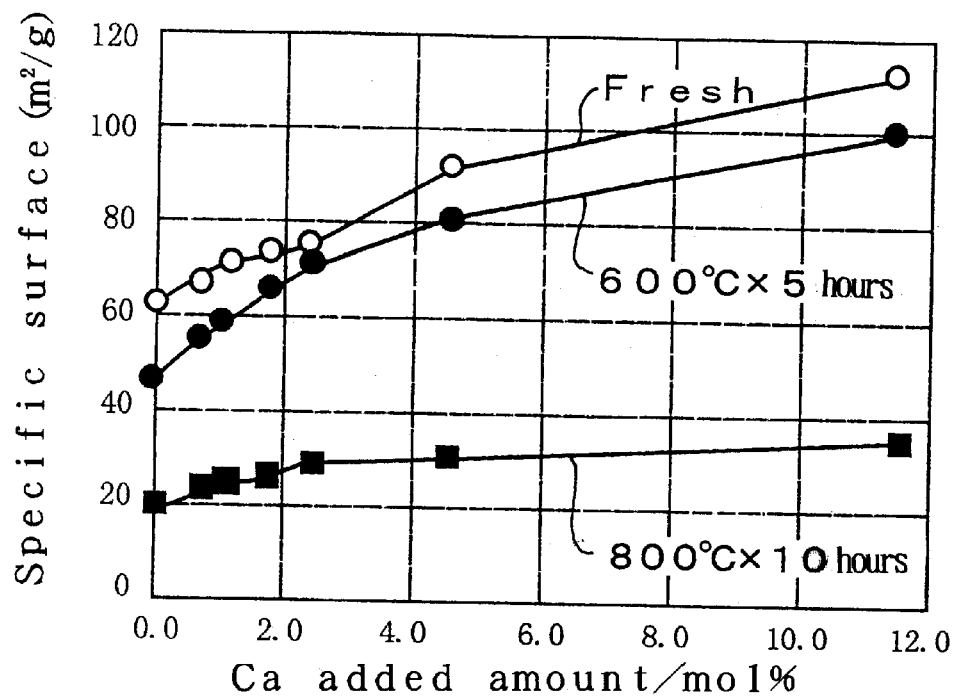
FIG. 1 is a graph showing relation between the Ca-added amount and the specific surface of the Ca-contained zirconia.

In the catalyst for purifying exhaust gas of the present invention, Pt is loaded on the first support while Rh is loaded on the second support. That is, due to the separate loading of Rh from Pt, disadvantage of the oxidizing ability of Pt being hindered by the adjacent Rh can be prevented. In addition, the particle growth of Rh in the lean atmosphere is extremely smaller that of Pt. Accordingly, presence of Rh elongates durability of the catalyst for purifying exhaust gas.

Furthermore, HC and $H_2O$ contained in the exhaust gas has created the hydrogen having large reducing force by assistance of Rh (steam reforming reaction), which contributes, together with HC and CO contained in the exhaust gas, to reduction of the NOx and to separation of SOx from the sulfate or the sulfite in the NOx occluding material. In this way, the NOx reducing amount in the rich pulse increases, and the sulfur poisoning of the NOx occluding material decreases remarkably.

By the way, as the second support for loading Rh thereon, using the zirconia capable of increasing the steam reforming reaction activity of Rh extremely is preferable. However, as mentioned above, the zirconia has smaller heat resistance than that of the alumina often used as the support for the noble metal, whereby the specific surface of the second support is decreased by heat when the catalyst is used for purifying exhaust gas. As a result, the dispersing performance of the loaded Rh decreases, which results in decrease of the purifying ability thereof.

In view of the above, in the present invention, the thermally stabilized zirconia having been zirconia having contained at least one of the alkaline-earth metal and the rare-earth element used as the second support loading Rh thereon.

As the zirconia, the zirconia having contained one of the alkaline-earth metal and the rare-earth element is preferably used. The second support using such zirconia, having become alkaline by the alkaline-earth metal or the rare-earth element, is excellent in the absorbing performance of the steam ($H_2O$). Therefore, the steam reforming reaction by Rh advances sufficiently to generate hydrogen, which promotes the reducing reaction of the NOx and the separating reaction of the SOx from the sulfate or the sulfite in the NOx occluding material.

Further, the second support having the remarkably increased heat resistance maintains the highly dispersed condition of Rh, whereby the steam reforming reaction by Rh advances more smoothly to further restrain the sulfur poisoning of the NOx occluding material. With these operations, according to the catalyst for purifying exhaust gas of the present invention, the NOx purifying ability has remarkably increased and the high purifying ability has been maintained even after the endurance test.

The porous particles forming the first support can be selected from the materials such as alumina, silica, titania, zirconia, silica-alumina and zeolite. One of these materials, or plural of these materials having been composed or mixed, can be used for the first support.

At least Pt is loaded on the first support to form the first powders. The loaded amount of Pt, relative to the first support of 120 g, preferably ranges from 0.1 g to 10 g. The loaded amount of Pt relative to the first support smaller than 0.1 g/120 g decreases the purifying rate of HC, CO and NOx, whereas when it is larger than 10 g/120 g not only the purifying effect saturates but the cost goes up. Here, in addition to Pt, Pd can be loaded on the first support; or in addition to Pt, Rh of which weight ratio relative to Pt not more than 10% can be loaded on the first support.

The second support formed by the zirconia having contained at least one of the alkaline-earth metal and the rare-earth element can be manufactured by the coprecipitation process or the sol-gel process. In the coprecipitation process, the second support formed by the zirconia having contained at least one of the alkaline-earth metal and the rare-earth element can be obtained by washing, drying and baking the precipitation coprecipitated from the solution in which the zirconium compound and one of the alkaline-earth metal compound and the rare-earthelement compound are dissolved.

In the sol-gel process, the second support formed by the zirconia having contained at least one of the alkaline-earth metal and the rare-earth element can be manufactured by drying and baking the sol obtained by hydrolyzing, after adding the water, the mixed solution of alkoxide of the zirconium and alkoxide of one of the alkaline-earth metal and the rare-earthelement.

When the second support thus obtained is subjected to the X-ray diffraction, peak resulted from the alkaline-earth metal or the rare-earth element being not observed, only peak of the zirconia is observed. Judging from this fact, the alkaline-earth metal or the rare-earth element is presumed to have solved into the zirconia. Here, the second support can be manufactured, in addition to the above manufacturing methods, by another methods such as powder mixing and baking and so on, and the alkaline-earth metal or the rare-earth element has not necessarily solved into the zirconia.

The preferable alkaline-earth metal contained in the zirconia forming the second support include magnesium (Mg), calcium(Ca), strontium (Sr) and barium (Ba). Among them, the more preferable results can be obtained by Ba and Ca.

The preferable rare-earth element contained in the second support include lanthanum (La), scandium (Sc), yttrium (Y), cerium (Ce), praseodymium (Pr), neodymium (Nd), samarium (Sm) and ytterbium (Yb). Among them, the more preferable result can be obtained by La.

As regard the contained amount of one of the alkaline-earth metal and the rare-earth element contained in the second support, some merit of them can be obtained no matter how little they are. However, the alkaline-earth metal or the rare-earth element is preferably contained by amount not more than 11.35 mole % or by amount not more than 11.0 mole %, respectively as the lower limit. The excessive alkaline-earth metal or the rare-earth element more than the upper limit is not preferable, since it decreasees nox purifying ability.

At least Rh is loaded on the second support to construct the second powders. The loaded amount of Rh in the second powders, relative to the second support of 120 g, preferably ranges from 0.1 g to 10 g. The loaded amount of Rh smaller than 0.1 g/120 g decreases durability of the second support, whereas when it is larger than 10 g/120 g not only the purifying effect saturates but the cost goes up. Here, in addition to Rh, Pd can be loaded on the second support or in addition to Rh, Pt of which weight ratio relative Rh is not more than 10% can be loaded on the second support.

The first powders and the second powders are mixed by a mixing ratio so that the first support and the second support have the weight ratio preferably in the range of 1:10 to 20:1, more preferably in the range of 1:2 to 5:1. If the weight ratio is larger or smaller than this range, the disadvantages same as that caused by the insufficient or excessive Rh and Pt may be caused.

In addition, particle diameters of the first powders and that of the second powders preferably ranges from 1 μm to 100 μm. When the particle diameters of powders are smaller than 1 μm the merit resulted from separated loading between Rh and Pt can be hardly obtained, while when they are larger 100 μm the action between the first powders and the second powders becomes small, thereby the purifying ability being decreased.

At least one kind of element selected from the alkali metals, alkaline-earth metal and rare-earth element can be used as the NOx occluding material. The alkali metals can include lithium (Li), sodium (Na), potassium (K) and cecium (Cs). The alkaline-earth metal, corresponding to 2A group elements in the periodic table, includes magnesium (Mg), calcium (Ca), strontium (Sr) and barium (Ba). The rare-earth element include lanthanum (La), cerium (Ce) and praseodymium (Pr).

These NOx occluding elements can be loaded on one of or both of the first support and the second support. However, due to bad sympathy of Rh with the NOx occluding material, under coexistence of them, there arises the problem that the characteristics of Rh and the NOx occluding material can not be exhibited sufficiently. In addition, the steam reforming reaction by Rh is deteriorated by the NOx occluding material. For this reason, the NOx occluding material is preferably loaded only in the first support. With such construction, the characteristic of the NOx occluding material can be exhibited sufficiently, and the steam reforming activity reaction of Rh can be exhibited to the maximum.

Loaded amount of the NOx occluding material preferably ranges from 0.01 mole to 5 mole per the whole support of 120 g, more preferably ranges from 0.1 mole to 0.5 mole. The loaded amount of the NOx occluding material smaller than 0.01 mole/120 g decreases the NOx purifying rate, while even if it is larger than 5 mole/120 g the purifying effect saturates.

The catalyst for purifying exhaust gas of the present invention can be manufactured by mixing the first powders loading at least Pt thereon and the second powders loading at least Rh thereon, and loading the NOx occluding material in the mixed powders. Also, the catalyst can be manufactured by mixing the first powders loading at least Pt and the NOx occluding material thereon and the second powders loading at least Rh thereon. Further, the catalyst can be manufactured by loading the NOx occluding material, between the first powders loading at least Pt thereon and the second powders loading at least Rh thereon, at least in the first powders or in both of the first powders and second powders, and mixing the first and second powders.

The catalyst for purifying exhaust gas of the present invention can be the pellet-type catalyst formed by the catalyst powders obtained in the above manufacturing method, or can be the monolith-type catalyst constructed by forming the coated layer of the catalyst powders on the honeycomb support substrate of heat resistant performance.

When the coated layer of the catalyst powders is formed on the support substrate, the loading density of Pt at the surface layer of the coated layer is preferably selected denser than that at the inside portion thereof. With such Pt loaded density, contacting possibility between the exhaust gas component and Pt increases to improve the reacting efficiency therebetween, thus the purifying ability of the catalyst being further increased.

That is, NO approached to the catalyst surface of the coated layer in the lean atmosphere is oxidized to NOx by Pt at the surface layer, and advances into the inside portion to be occluded in the NOx occluding material. In the rich pulse condition, NOx emitted from the NOx occluding material reacts with the hydrogen created by HC and $H_2O$ by the steam reforming reaction of Rh, with the catalyst operation of Pt loaded on the surface layer in high density, in passing through the surface layer. Thus, NOx is reduced to $N_2$ by the hydrogen and then is discharged. In this way, with loading Pt in the surface layer in high density, not only the utilizing efficiency of HC has further increased but the purifying ability of the NOx has further increased in the rich pulse condition. In addition, the reducing reaction by the hydrogen for SOx strongly joined to the NOx occluding material is further activated. Thus, the NOx occluding material restores the original NOx occluding function thereof to further increase the NOx purifying ability.

The loaded amount of Pt loaded on the surface layer portion of the coated layer preferably ranges from 0.1 g to 10 g per the porous particles of 120 g in the whole catalyst, and more preferably ranges from 0.1 g to 2 g. If the loaded amount of Pt smaller than 0.1 g, above effect of Pt resulted from high density loading in the surface layer portion can not be obtained, while if it is larger than 2 g the purifying effect saturates and the cost goes up.

The amount of Pt equivalent to that of the conventional catalyst is sufficiently loaded on the whole catalyst to prevent rise of the cost. For example, total amount of Pt loaded on the first powders and Pt loaded on the surface layer ranges from 0.1 g to 10 g, which means the former can be varied in the range of 0 g to 10 g and the latter can be varied in the range of 10 g to 0 g.

In addition, Rh can be loaded on the surface layer portion of the coated layer besides the second powders. In this case however, the amount of Rh loaded on the surface layer portion relative to the amount of Pt loaded on the surface layer is preferably not more than 10%. If this rate is larger than 10%, the oxidizing ability of Pt loaded on the surface layer portion decreases, which decreases the NOx purifying ability of the catalyst.

Further, the NOx occluding material can be concentratedly loaded on the surface layer of the coated layer. In this case, the alkali metals having the high occluding ability by small amount is preferably used as the NOx occluding material. The amount of NOx occluding material in the surface layer per the porous particles of 120 g of the whole catalyst ranges from 0 mole to 5 mole, and more preferably ranges from 0.1 mole to 0.5 mole. The excessively loaded NOx occluding material may remarkably decrease the purifying ability of the noble metals.

In this way, according to the catalyst for purifying exhaust gas and the exhaust gas purifying method of the present invention, with use of the second powders in which Rh is loaded on the zirconia having contained at least one of the alkaline-earth metal and the rare-earth element, the steam reforming reaction activity of Rh has remarkably increased. Also, with the separate loading of Pt and Rh, the oxidizing activity of Pt being not decreased, the heat resistant performance of the catalyst has increased. With these operations, the catalyst exhibits the higher NOx purifying activity even after the endurance test.

Further, the remarkable increase of the steam reforming reaction activity of Rh restrains the sulfur poisoning of the NOx occluding material by sulfur, so that the high NOx purifying activity of the catalyst is maintained high even after the endurance test to further elongate the durability.

Embodiments

In the following, the present invention will be explained concretely with reference to test samples, embodiments and comparative samples.

<Test Samples>

In the first, characteristic of the zirconia contained the alkaline-earth metal has been tested by the test samples.

(Preparation of Ca-contained Zirconia)

Six kinds of Ca-contained zirconias, each including 0.66 mole % of Ca, 1.09 mole % of Ca, 1.74 mole % of Ca, 2.39 mole % of Ca, 4.63 3 mole % of Ca and 11.35 mole % of Ca, have been prepared by the co-precipitation method, by adding the ammonia water to the mixed solution of the zirconium compound and the calcium compound.

(Preparation of Ba-contained Zirconia)

Five kinds of Ba-contained zirconia, each including 0.48 mole % of Ba, 0.94 mole % of Ba, 1.83 mole % of Ba, 2.94 mole % of Ba and 5.37 mole % of Ba, have been prepared by the co-precipitation method with adding the ammonia water to the mixed solution of the zirconium compound and the barium compound.

(Test Sample 1)

Figure 2:
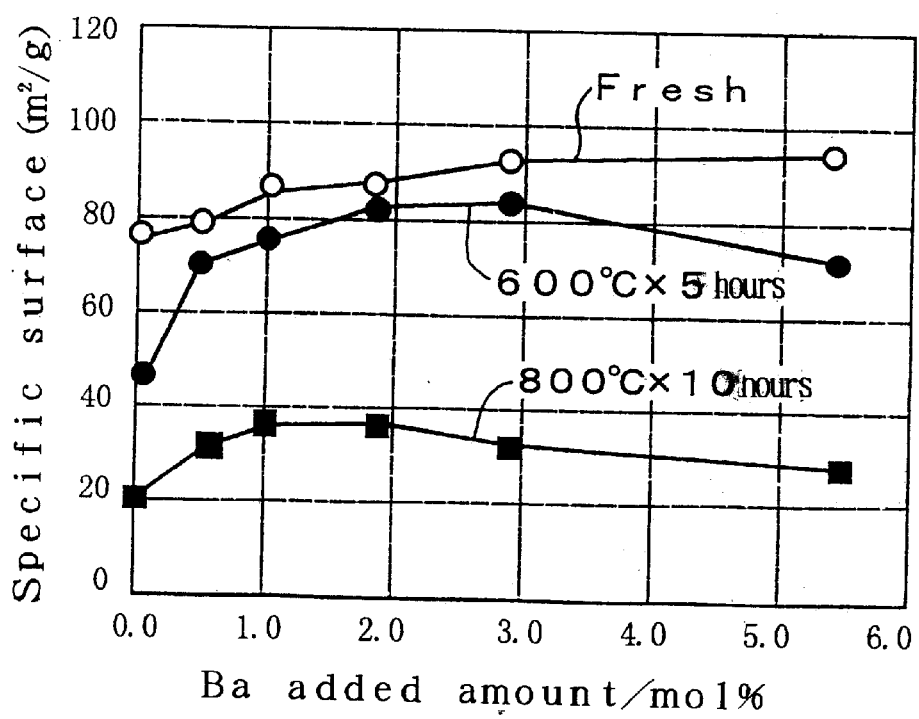
FIG. 2 is a graph showing relation between the Ba-added amount and the specific surface of the Ba-contained zirconia.

The specific surface of the contained zirconia contained Ca (Ca-contained zirconia) and that contained Ba (Ba-contained zirconia) having been measured and are respectively shown in FIGS. 1 and 2 as the initial value (Fresh). The specific surface of Ca-contained zirconia and that of Ba-contained zirconia each having been subject to the high temperature treatment in the atmosphere under two conditions, that is, at 600 C in 5 hours and at 800° C. in 10 hours are shown in FIGS. 1 and 2 respectively. The pure zirconia not having contained the alkaline-earth metal is tested similarly.

As apparent from FIGS. 1 and 2, adding Ca and Ba increases the specific surfaces of the stabilized zirconia after the high temperature treatment, compared to that of the pure zirconia. Also, as the added amount of Ca increases the specific surface of the stabilized zirconia after the high temperature treatment increases, while the added Ba of 2 to 3% saturates the specific surface of the Ba-stabilized zirconia have been confirmed.

(Test Sample 2)

Each of the Ca-contained zirconia, Ba-contained zirconia and pure zirconia having been impregnated the rhodium nitrate aqueous solution therein is evaporated and dried to load Rh thereon The Rh of 0.5 g is loaded per each of Ca-contained zirconia, Ba-contained zirconia and pure zirconia of 120 g.

Each of three Rh loaded zirconias has been absorbed CO by the CO chemical absorbing method to measure the absorbed amount of CO. Also, each of three Rh loaded zirconias has been subjected to the high temperature treatment in the atmosphere at 600° C. in 5 hours, and then the CO absorbed amount thereof has been measured similarly.

Figure 3:
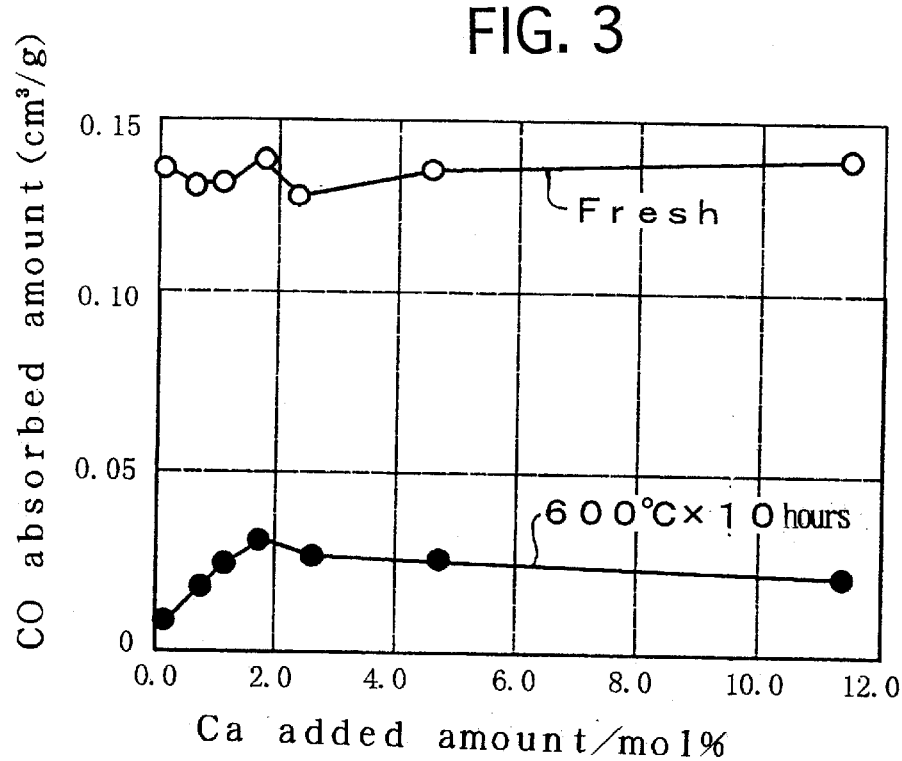
FIG. 3 is a graph showing relation between the Ca-added amount and the CO absorbed amount of the Ca-contained zirconia.
Figure 4:
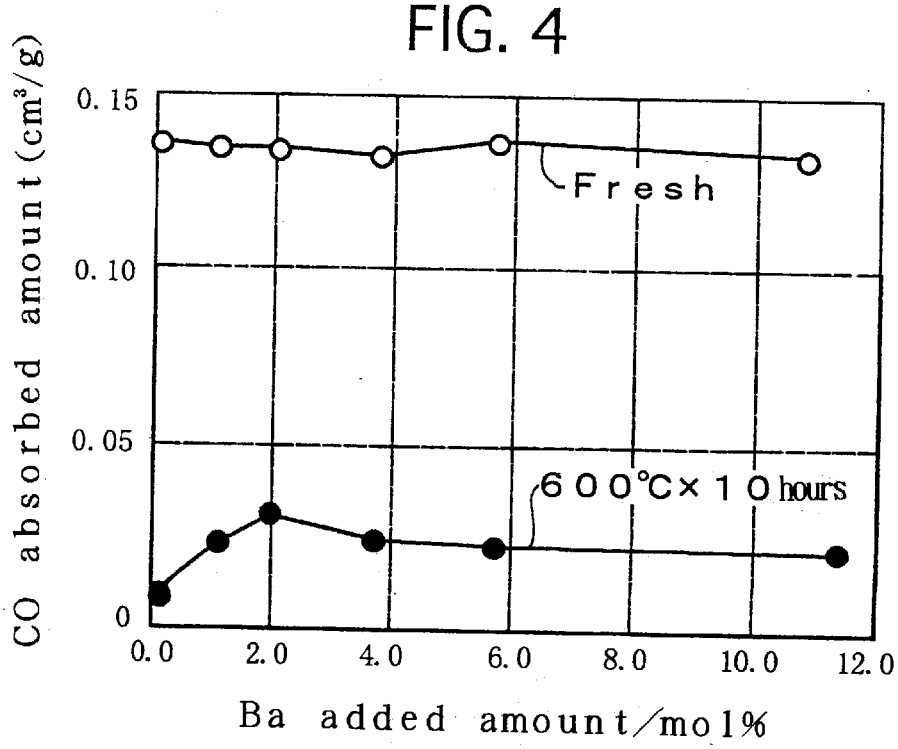
FIG. 4 is a graph showing relation between the Ba-added amount and the CO-absorbed amount of the Ba-contained zirconia.

The measured results of the Ca-contained zirconia and Ba-contained zirconia are shown in FIGS. 3 and 4 respectively.

As apparent from FIGS. 3 and 4, the CO absorbed amount after the high temperature treatment has increased by the added alkaline-earth metal in the contained zirconia. Judging from this fact, it is presumed the high dispersing performance of Rh and the large surface area of Ph after the high temperature treatment enable Rh to have many numbers of the activating points. Thus, it is confirmed the adding alkaline-earth metal to the zirconia has greatly restrained deterioration of the loaded Rh.

(Test Sample 3)

Each of the Ca-contained zirconia, Ba-contained zirconia and pure zirconia having been impregnated the rhodium nitrate aqueous solution therein is evaporated and dried to support Rh thereon. The Rh of 0.5 g is loaded per each of contained zirconias and pure zirconia of 120 g.

Each of three Rh loaded zirconias has been subjected to the high temperature treatment at 600° C. in 10 hours, and then to the steam reforming reaction with using the gas having the composition shown in the following Table 1 in the temperature range of 300° C. to 600° C. The hydrogen created amount has been measured by the gas chromatograph, the measured results of which are shown in FIGS. 5 and 6.

TABLE 1

| HC | CO | $O_2$ | NO | $H_2O$ | $N_2$ |
|---|---|---|---|---|---|
| 6700 ppmC | 5900 ppm | 0.6% | 100 ppm | 3% | rest |

Figure 5:
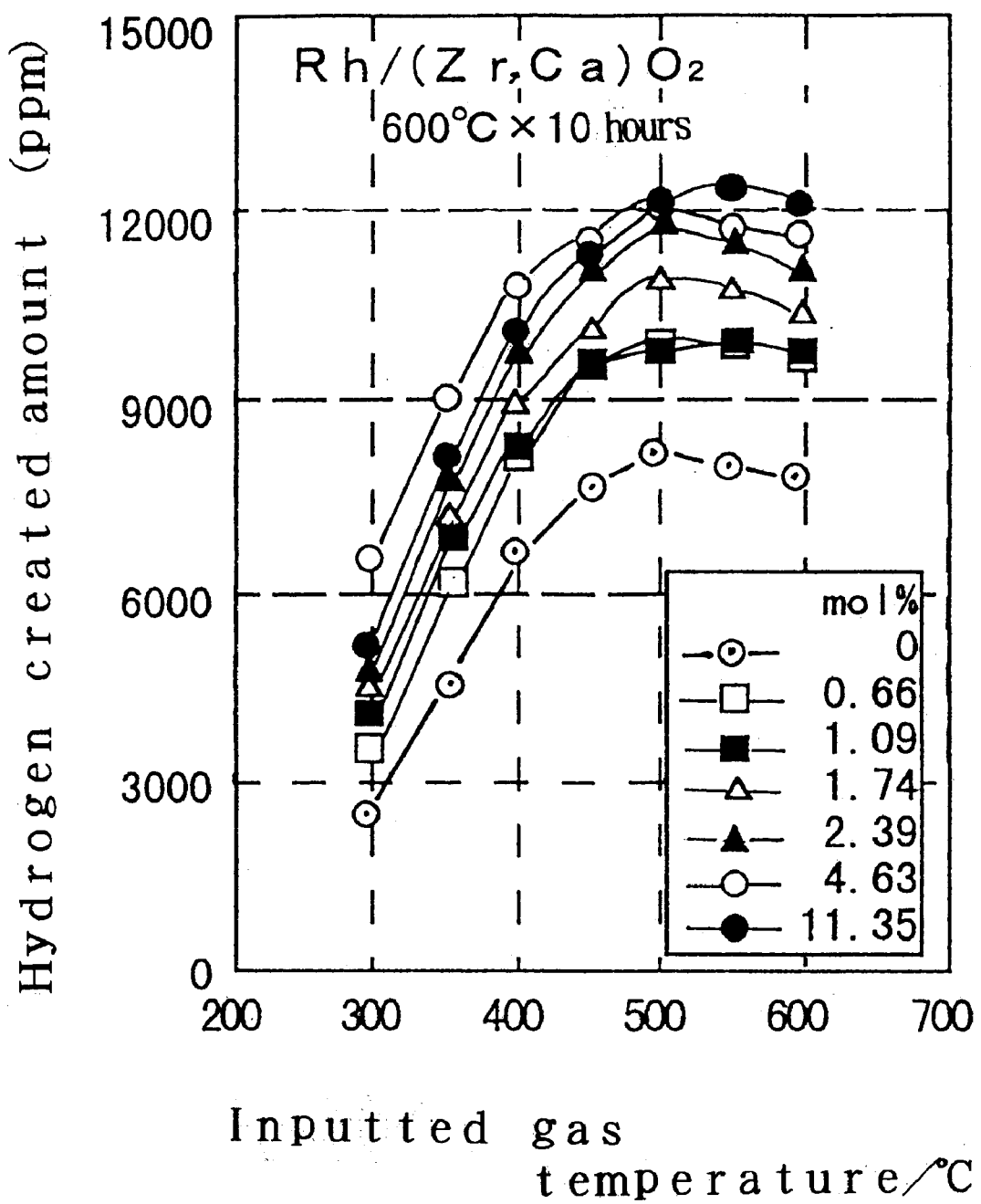
FIG. 5 is a graph showing relation between the inputting gas temperature and the hydrogen created amount of the Ca-contained zirconia loading Rh thereon.
Figure 6:
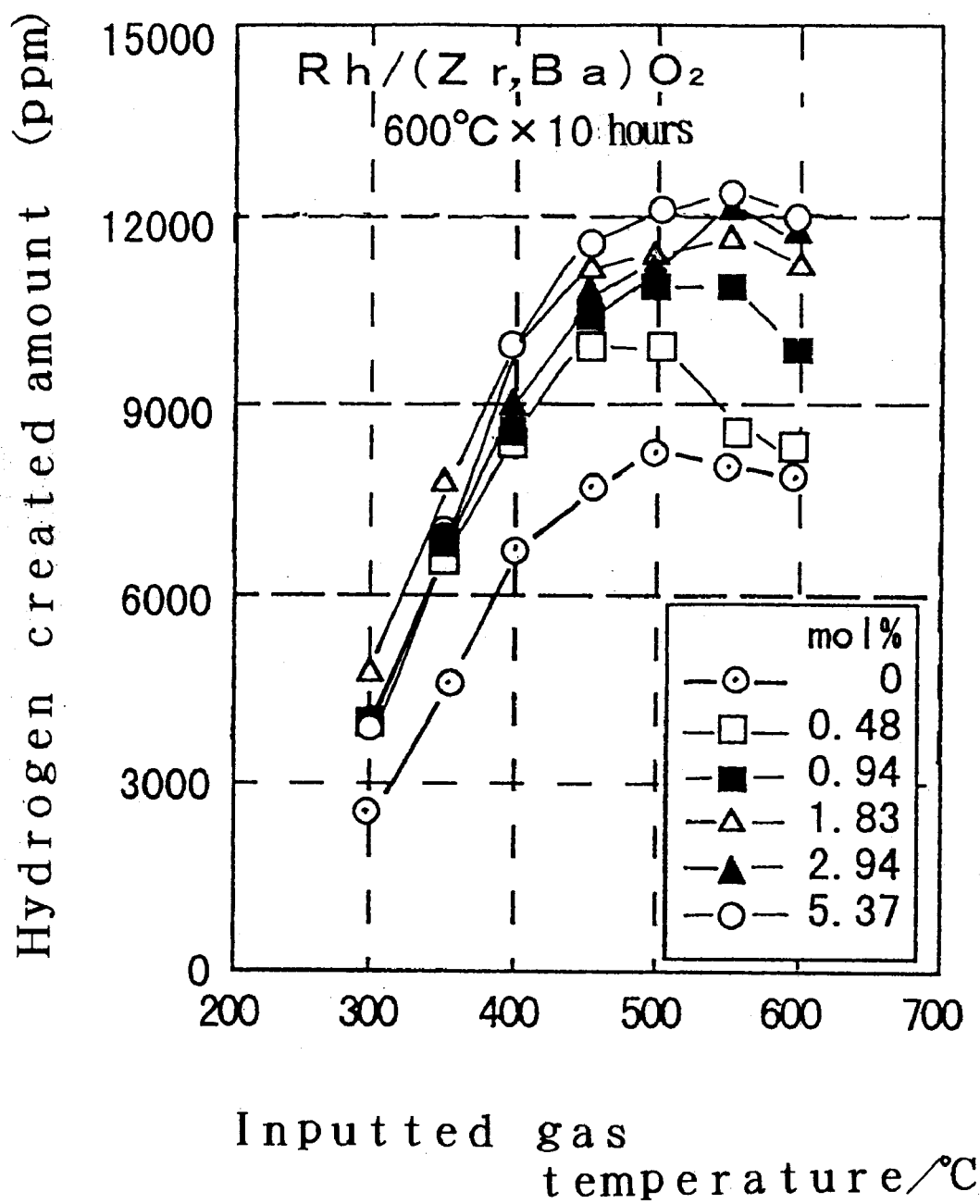
FIG. 6 is a graph showing relation between the inputting gas temperature and the hydrogen created amount of the Ba-contained zirconia loading Rh thereon.

As apparent from FIGS. 5 and 6, as the added amount of the alkaline-earth metal increases the hydrogen created amount after the high temperature treatment increases, which reveals the added alkaline-earth metal have improved the steam reforming reaction activity.

(Test Sample 4)

Figure 7:
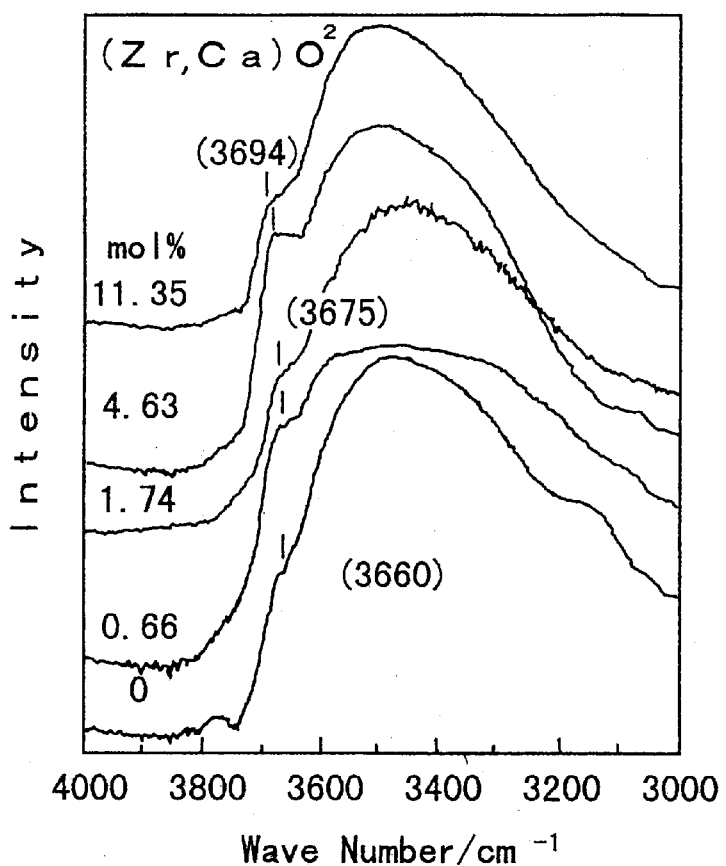
FIG. 7 is a diagram showing the infrared absorbing spectrum of the Ba-contained zirconia.

The Ca-contained zirconia has been subjected to the infrared spectral analysis, the resultant IR spectrum of which is shown in FIG. 7. As apparent from FIG. 7, as the added amount of Ca increases the peak of intensity due to the hydroxy group has shifted toward larger wave number, and the hydroxy group has lager alkaline performance. Judging from this fact, it is assumed the water absorbing force of the zirconia has increased with increase of the added amount of Ca, which improves the steam reforming reaction activity as described in the above test sample 3.

The results in the above test samples 1 to 4 have clarified the following points. The zirconias having contained the alkaline-earth metal have the large specific surface after the high temperature treatment, which increases durability of dispersing performance of Rh to restrain deterioration of the catalyst. In addition, the steam reforming reaction activity of Rh is maintained high even after the high temperature treatment due to the increased alkaline performance of the hydroxy group, so that the hydrogen creating activity has greatly increased when the zirconias having contained the alkaline-earth metal are used. For this reason, it is expected using the zirconia contained the alkaline-earth metal can increase the NOx purifying activity after the endurance test and can decrease the sulfur poisoning of the NOx occluding material.

(Embodiment 1)

Figure 8:
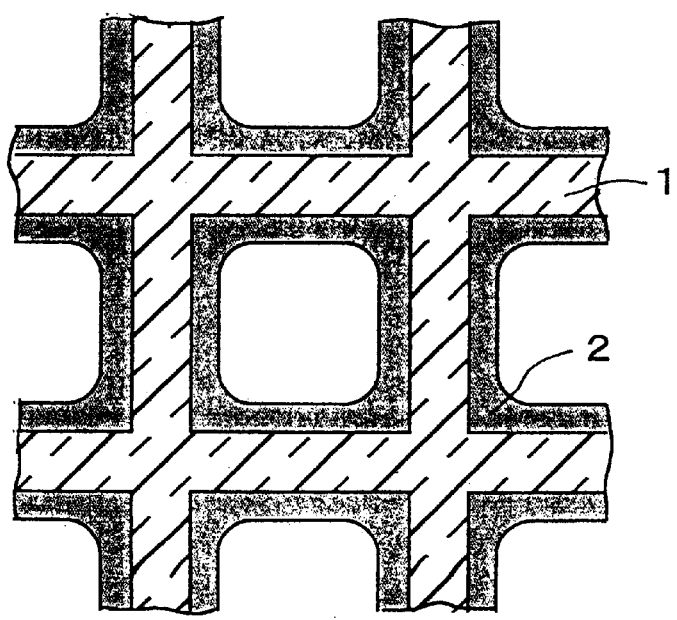
FIG. 8 is a schematic explanatory view of the catalyst for purifying exhaust gas of one embodiment according to the present invention.
Figure 9:
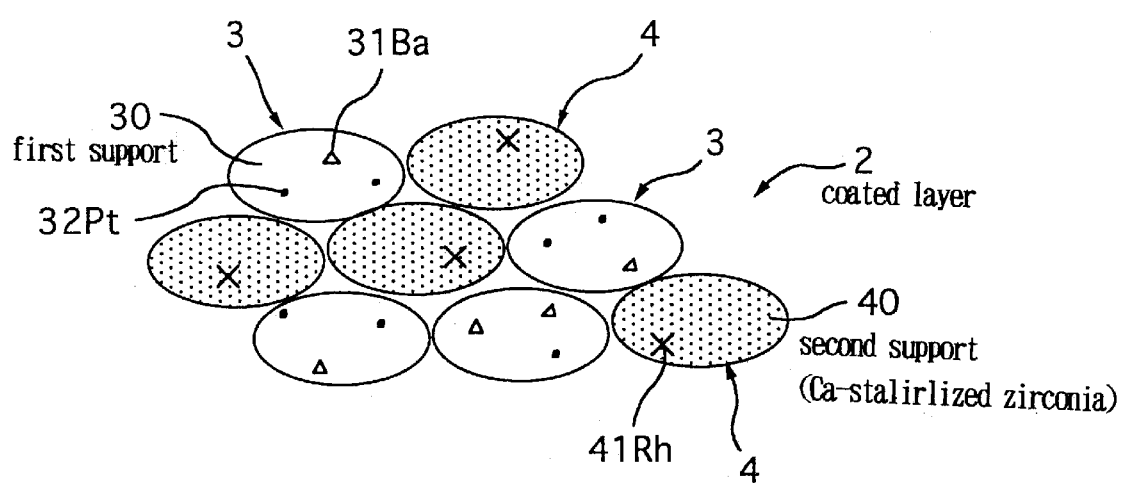
FIG. 9 is a construction explaining view showing inside of the coated layer 2 of FIG. 8.

FIGS. 8 and 9 show the catalyst for purifying exhaust gas according to the first embodiment of the present invention. This catalyst is constructed by a honeycomb substrate 1 made of cordierite, and a coated layer 2 formed on a surface of the honeycomb substrate 1 and made of the alumina, titania and Ca-contained zirconia.

The coated layer 2 is, as shown in FIG. 9, formed by mixing first powders 3 in which Ba 31 and Pt 32 are loaded on a first support 30 made of the alumina and titania, and second powders 4 in which Rh 41 is loaded on a second support 40 made of zirconia stabilized by Ca. On a surface layer portion of the coated layer 2, Pt, Rh, K and Li(not illustrated) are loaded.

In the following, a manufacturing method of this catalyst will be explained for clarifying construction thereof.

<Preparation of First Powders>

To the first support powders made by mixing the γ-alumina powders of 480 g and the titania powders of 120 g, the barium acetate aqueous solution of predetermined density is impregnated by predetermined amount, then the powders-aqueous solution mixture is dried at 110° C. in 3 hours with stirring to evaporate the water content. The dried powders are, after being crushed, baked at 500° C. in 3 hours to support the Ba thereon. The loaded amount of Ba is 1.6 mole per the first support powders of 600 g.

Then, the powders thus obtained are immersed into the ammonium hydrogen carbonate aqueous solution of 6L having density of 0.3 mole/L, and the aqueous solution is filtered after stirring of 15 minutes. The filtered powders are dried at 110° C. in 3 hours, and then crushed. With this treatment, Ba has changed to the barium carbonate and is uniformly loaded on the first support powders.

This Ba-loaded first support powders are immersed into dinitorodiamine plutium nitrate aqueous solution of predetermined density, and then the aqueous solution is filtered. The filtered powders are dried at 110° C. in 3 hours, crushed and dried at 400° C. in 1 hour to load Pt thereon. Then, the Pt-loaded powders are immersed into the rhodium nitrate aqueous solution of predetermined density, and then the aqueous solution is filtered. The filtered powders are dried at 110° C. in 3 hours, crushed and dried at 400° C. in 2 hours to load Rh thereon. The loaded amount of Pt is 4.0 g and that of Rh is 0.2 g respectively per the first support powders of 600 g. In this way, the first powders have been prepared.

<Preparation of Second Powders>

By adding the ammonium water to the mixed aqueous solution of the zirconium compound and the calcium compound, the Ca-contained zirconia powders including Ca of 0.66 mole % has been prepared by the coprecipitation method.

The Ca-contained zirconia powders of 384 g are immersed into the rhodium nitrate aqueous solution of predetermined density, and then the aqueous solution is filtered. The filtered powders are dried at 110° C. in 3 hours, crushed and baked at 400° C. in 1 hour to load Rh thereon. The loaded amount of Rh is 2.0 g per the Ca-contained zirconia powders of 384 g. In this way, the second powders have been prepared.

<Formation of Coated Layer>

With the uniform mixture of the whole first powders and the whole second powders, the alkaline zirconia sol of 340 g, the pure water of 1000 g and the 28% ammonia water of 10 g have been mixed. The mixture is, after sufficient stirring, milled by the attriter to be slurried. This slurry has pH of 9.

The honeycomb substrate having the capacity of 1.3 L and made of cordierite is immersed in the slurry, and then pulled up to blow off unnecessary slurry. The honeycomb substrate is then dried and baked to be formed the coated layer thereon. The coated layer of 320.5 g has been formed per the honeycomb substrate of 1 L in the baked weight.

<Loading of Pt, Rh, K and Li on Surface Layer Portion>

The honeycomb substrate being formed the coated layer thereon is immersed in the dinitorodiamine-plutiumnitrate aqueous solution of predetermined density, pulled up to blow off the unnecessary droplets, and dried at 110° C. in 3 hours. Then, the honeycomb substrate is immersed in the rhodium nitrate aqueous solution of predetermined density, pulled up to blow off the unnecessary droplets, and dried at 250° C. in 3 hours. Then, the honeycomb substrate is baked at 400° C. in 1 hour. On the surface layer of the coated layer, Pt of 1 g and Rh of 0.05 g respectively per the substrate of 1 L have been additionally loaded.

Further, this honeycomb substrate is immersed in the potassium nitrate aqueous solution of predetermined density and the lithium nitrate aqueous solution of predetermined density, pulled up to blow off the unnecessary droplets, dried at 250° C., and baked at 500° C. in 1 hour. Thus the catalyst of the embodiment 1 has been obtained. On the surface layer of the coated layer, K of 0.1 mole and Li of 0.1 mole respectively per substrate of 1 L have been additionally loaded.

<Evaluation Test>

Each of the obtained honeycomb catalysts installed to the gas exhausting system of lean burn engine of 1.8 L, has been subjected to the endurance test corresponding to the actual running of 50000 Km. Thereafter, in the same gas exhausting system (inputting gas temperature: 400° C.), the NOx occluded amount under the lean condition, the NOx reduced amount in the rich pulse (0.3 sec.), and the NOx emission in the 10–15 mode driving condition have been measured. The measured results are shown in the Table 2.

The degree of sulfur poisoning of the NOx occluding material in the endurance test has been calculated by the difference of NOx purifying rates before and after the endurance test, and is shown in the Table 2 as the absolute value relative to result of the catalyst of the comparative sample 1 to be explained later.

(Embodiment 2)

In the Ca-contained zirconia powders having been prepared to contain Ca of 1.74 mole %, Rh is loaded on the same manner as that of the above embodiment 1, thereby the second powders being prepared.

The second powders are mixed with the first powders same as that of the above embodiment 1 to form the coated layer, followed by the additional loading of Pt, Rh, K and Li on the coated layer. Thus, the catalyst of the embodiment 2 has been prepared. This catalyst of the embodiment 2 has been subjected to the evaluation test similar to the catalyst of the embodiment 1, the result of which is shown in the Table 2.

(Embodiment 3)

In the Ca-contained zirconia powders having been prepared to contain Ca of 4.63 mole %, Rh is loaded on the same manner as that of the above embodiment 1, thereby the second powders being prepared. The second powders are mixed with the first powders same as that of the above embodiment 1 to form the coated layer, followed by the additional loading of Pt, Rh, K and Li on the coated layer. Thus, the catalyst of the embodiment 3 has been prepared. This catalyst of the embodiment 3 has been subjected to the evaluation test similar to the catalyst of the embodiment 1, the result of which is shown in the Table2.

(Embodiment 4)

In the Ca-contained zirconia powders having been prepared to contain Ca of 11.35 mole %, Rh is loaded on the same manner as that of the above embodiment 1, thereby the second powders being prepared. The second powders are mixed with the first powders same as that of the above embodiment 1 to form the coated layer, followed by the additional loading of Pt, Rh, K and Li on the coated layer. Thus, the catalyst of the embodiment 4 has been prepared. This catalyst of the embodiment 4 has been subjected to the evaluation test similar to the catalyst of the embodiment 1, the result of which is shown in the Table 2.

(Embodiment 5)

With the aqueous solution of the barium compound such as the barium acetate etc., the Ba-contained zirconia powders containing Ba of 0.48 mole % is prepared in the same manner as the Ba-contained zirconia powders of the above embodiment 1. Then, Rh is loaded on the Ba-zirconia powders in the same manner as that of the embodiment 1, thereby the second powders being prepared. Then, the second powders are mixed with the first powders same as that of the embodiment 1 to form the coated layer, and Pt, Rh, K and Li are additionally loaded on the coated layer in the same manner as that of the embodiment 1. Thus the catalyst of the embodiment 5 has been prepared. The catalyst of the embodiment 5 has been subjected to the evaluation test similar to the catalyst of the embodiment 1, the result of which is shown in the Table 2.

(Embodiment 6)

With the aqueous solution of the barium compound such as the barium acetate etc., the Ba-contained zirconia powders containing Ba of 1.83 mole % is prepared in the same manner as the Ba-contained zirconia powders of the above embodiment 1. Then, Rh is loaded on the Ba-zirconia powders in the same manner as that of the embodiment 1, thereby the second powders being prepared. Then, the second powders are mixed with the first powders same as that of the embodiment 1 to form the coated layer, and Pt, Rh, K and Li are additionally loaded on the coated layer in the same manner as that of the embodiment 1. Thus, the catalyst of the embodiment 6 has been prepared. The catalyst of the embodiment 6 has been subjected to the evaluation test similar to the catalyst of the embodiment 1, the result of which is shown in the Table 2.

(Embodiment 7)

With the aqueous solution of the barium compound such as the barium acetate etc., the Ba-contained zirconia powders containing Ba of 2.94 mole % is prepared in the same manner as the Ba-contained zirconia powders in the above embodiment 1. Then, Rh is loaded on the Ba-zirconia powders in the same manner as that of the embodiment 1, thereby the second powders being prepared. Then, the second powders are mixed with the first powders same as that of the embodiment 1 to form the coated layer, and Pt, Rh, K and Li are additionally loaded on the coated layer in the same manner as that of the embodiment 1. Thus the catalyst of the embodiment 7 has been prepared. The catalyst of the embodiment 7 has been subjected to the evaluation test similar to the catalyst of the above embodiment 1 the result of which is shown in the Table 2.

(Embodiment 8)

With the aqueous solution of the barium compound such as the barium acetate etc., the Ba-contained zirconia powders containing Ba of 5.37 mole % is prepared in the same manner as the contained zirconia powders of the above embodiment 1. Then, Rh is loaded on the Ba-zirconia powders in the same manner as that of the embodiment 1, thereby the second powders being prepared. Then, the second powders are mixed with the first powders same as that of the embodiment 1 to form the coated layer, and Pt, Rh, K and Li are additionally loaded on the coated layer in the same manner as that of the embodiment 1. Thus, the catalyst of the embodiment 8 has been prepared. The catalyst of the embodiment 8 has been subjected to the evaluation test similar to the catalyst in the embodiment 1, the result of which is shown in the Table 2.

sample 1 has been subjected to the evaluation test similar to the catalyst of the embodiment 1, the result of which is shown in the table 2.

(Comparative Sample 2)

The slurry has been prepared by mixing the mixed powder including the γ-alumina powders of 480 g, titania powders of 120 g and zirconia powders of 384 g, with the alkaline zirconia sol of 340 g, pure water of 1000 g and 28% ammonia water of 10 g sufficiently, and then milling the mixture by the attriter. This slurry is used to form the coated layer in the same manner as that of the above embodiment 1.

Next, the barium acetate aqueous solution of predetermined density is impregnated in the honeycomb substrate having the coated layer by the predetermined amount, and then the honeycomb substrate is dried at 110° C. and baked at 500° C. in 3 hours, thereby Ba being loaded thereon. The loaded amount of Ba per the honeycomb substrate of 1 L is same as that of the catalyst in the embodiment 1. The Ba-loaded honeycomb substrate is immersed in the ammonium carbonate aqueous solution and pulled up to be dried at 110° C.

Then, the honeycomb substrate is immersed in the dinitorodiamine plutium nitrate aqueous solution of predetermined density, pulled up to blow off the unnecessary droplets, and dried at 110° C. in 3 hours. Then, the honeycomb substrate is immersed in the rhodium nitrate aqueous solution of predetermined density, pulled up to blow off the unnecessary droplets, dried at 110° C. in 3 hours, and baked at 400° C. in 2 hours. Thus, Pt and Rh have been loaded on the coated layer. The respective loaded amount of Pt and Rh is same as that of the embodiment 1.

Then, Pt, Rh, K and Li have been loaded on the surface layer portion of the coated layer same as that of the above embodiment 1, thereby the catalyst of the comparative sample 2 being prepared. The catalyst of the comparative sample 2 has been subjected to the evaluation test in the same manner as that of the embodiment 1, the result of which is shown in the Table 2.

TABLE 2

| | | contained zirconia | | NOx | | | sulfur poi- |
|---|---|---|---|---|---|---|---|
| | metal | added amount | occluded amount | reduced amount | emission | | soning amount (abso.value) |
| emb. 1 | Ca | 0.66 mole % | 281 mg | 214 mg | 0.129 g/km | | 0.79 |
| emb. 2 | Ca | 1.74 mole % | 321 mg | 290 mg | 0.121 g/km | | 0.73 |
| emb. 3 | Ca | 4.63 mole % | 311 mg | 275 mg | 0.115 g/km | | 0.68 |
| emb. 4 | Ca | 11.35 mole % | 308 mg | 274 mg | 0.112 g/km | | 0.69 |
| emb. 5 | Ba | 0.48 mole % | 240 mg | 188 mg | 0.113 g/km | | 0.79 |
| emb. 6 | Ba | 1.83 mole % | 277 mg | 209 mg | 0.110 g/km | | 0.72 |
| emb. 7 | Ba | 2.94 mole % | 340 mg | 301 mg | 0.099 g/km | | 0.67 |
| emb. 8 | Ba | 5.37 mole % | 343 mg | 312 mg | 0.094 g/km | | 0.65 |
| com. 1 | — | — | 221 mg | 163 mg | 0.168 g/km | | 1 |
| com. 2 | — | — | 190 mg | 102 mg | 0.188 g/km | | 1.22 |

(Comparative Sample 1)

Rh is loaded on the zirconia powders of 99.5% purity (including HfO$_2$), instead for the Ca-contained zirconia powders, to prepare the second powders in the same manner as that of the above embodiment 1. The second powders are mixed with the first powders same as that of the embodiment 1 to form the coated layer, and Pt, Rh, K and Li are additionally loaded to the coated layer in the same manner as that of the embodiment 1 to prepare the catalyst of the comparative sample. The catalyst of this comparative As apparent from the Table 2, in the catalysts of the embodiments 1 to 8, both of the NOx occluded ability and the Nox reduced amount after the endurance test have greaty increased compared with that of the comparative samples 1 and 2, so that the NOx emission in the 10–15 mode has greatly decreased. This advantages has clearly resulted from use of the Ca-contained zirconia or Ba-contained zirconia.

In addition, the catalysts of the embodiments 1 to 8 have the smaller sulfur poisoning amount than that of the comparative samples 1 and 2, which has clearly resulted from use of the Ca-contained zirconia or Ba-contained zirconia. Further, the correlation can be observed between the increasing tendency of the NOx occluded amount, NOx reduced amount and the decreasing tendency of NOx emission, and the sulfur poisoning amount.

(Embodiment 9)

Figure 10:
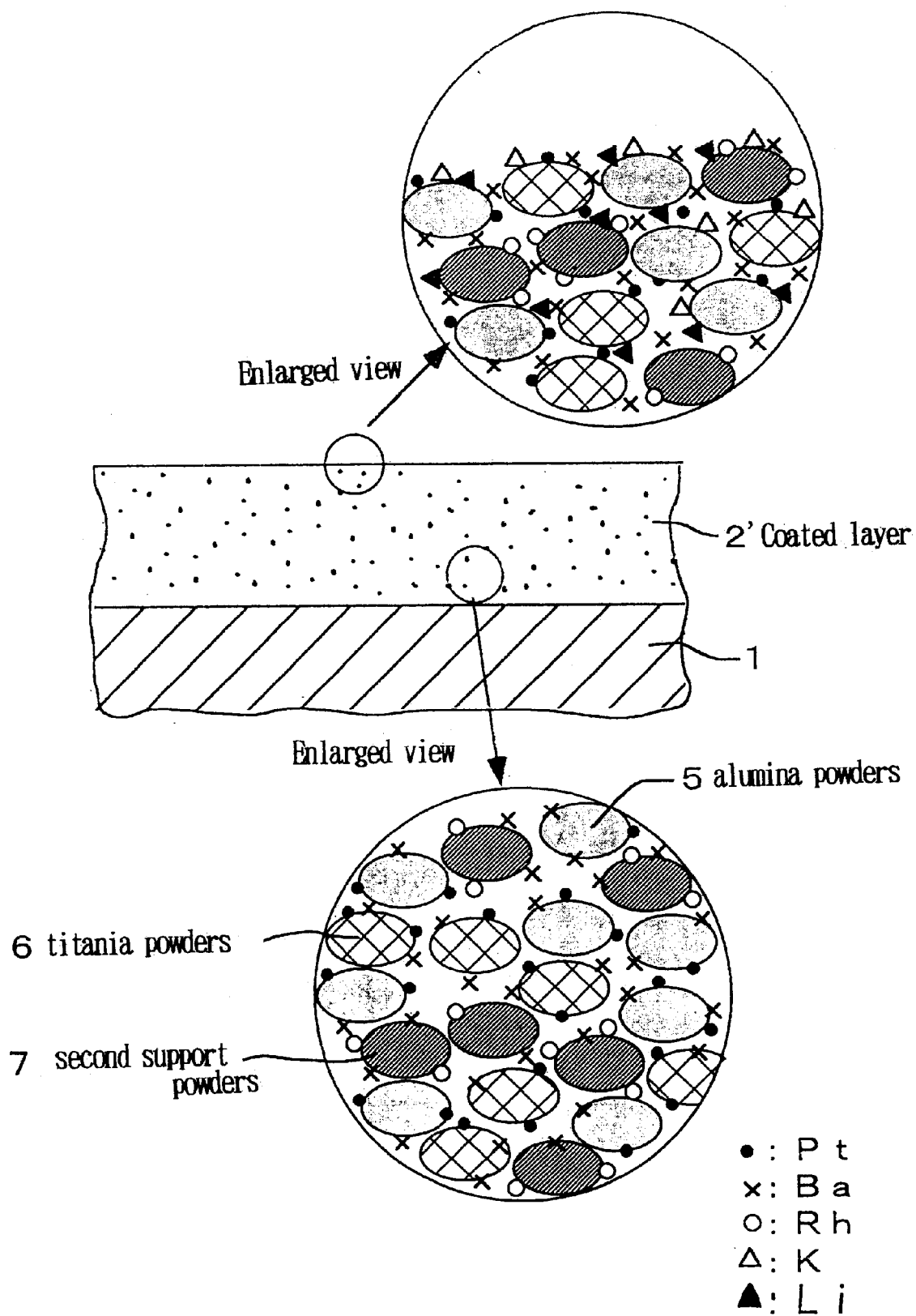
FIG. 10 is a cross-sectional view of the catalyst for purifying exhaust gas of the ninth embodiment according to the present invention.

FIG. 10 shows the catalyst for purifying exhaust gas according to the ninth embodiment of the present invention. This catalyst is constructed by a honeycomb substrate 1 made of codierite, and a coated layer 2' formed on a surface of the honeycomb substrate 1 and made of the alumina, titania and La-contained zirconia.

The coated layer 2' is constructed by mixing the powders in which Ba and Pt are loaded on the alumina powders 5, the powders in which Ba and Pt are loaded on the titania powders 6, and the powders in which Rh and Ba are loaded on the second support 7 made of the La-contained zirconia powders. The powders in which Ba and Pt are loaded on the alumina powders 5 and the powders in which Ba and Pt are loaded on the titania powders 6 have constructed the first powders, and the powders in which Rh and Ba are loaded on the second support 7 has constructed the second powders. On the surface layer portion of the coated layer 2', K and Li are additionally loaded.

Next, the manufacturing method of this catalyst will be explained to explain the construction thereof.

The alumina powders of 100 g and the titania powders of 100 g are mixed to prepare the first support powders.

By adding the ammonium water to the mixed solution of the zirconium compound and the lanthanum compound, the La-contained zirconia powders including La of 1.1 mole % has been prepared by the coprecipitation method. The La-contained zirconia powders of 50 g are immersed into the rhodium nitrate aqueous solution of predetermined density, and then the aqueous solution is filtered. The filtered powders are dried at 110° C. in 3 hours, crushed and baked at 400° C. in 1 hour. Thus, the second powders loading the Rh have been prepared. In the second powders, the loaded amount of Rh is 0.5 g per the La-contained zirconia powders of 50 g.

The whole first powders, the whole second powders, the alumina sol of 140 g and the pure water of 250 g have been mixed, and then mixed solution is, after sufficient stirring, milled by the attriter to be slurried.

The honeycomb substrate having the capacity of 1.3 L and made of the cordierite is immersed in this slurry, and then pulled up to blow off unnecessary slurry. The honeycomb substrate is then dried and baked to be formed the coated layer thereon. The coated layer of 260 g has been formed per the honeycomb substrate of 1 L in the baked weight.

Then after, the honeycomb substrate having the coated layer is impregnated the barium acetate aqueous solution of predetermined density by predetermined amount therein, and is evaporated the water content with stirring the aqueous solution. Then, the honeycomb substrate is baked at 500° C. in 3 hours to load Ba in the coated layer. Ba of 0.2 mole is loaded per the honeycomb substrate of 1 L. The honeycomb substrate loading Ba is immersed into the ammonium hydrogen carbonate aqueous solution of 0.3 mole/L density, and the aqueous solution is filtered after stirring of 15 minutes. Then, the honeycomb substrate is dried at 110° C. in 3 hours. Thus, Ba changes to the barium carbonate and uniformly loaded on the coated layer.

Next, the honeycomb substrate having the coated layer in which the above Rh and Ba have been loaded is immersed into dinitorodiamine plutium nitrate aqueous solution, pulled up and dried at 250° C., and baked at 400° C. in 1 hour. In this way, Pt of 2.0 g has been loaded on the honeycomb substrate of 1 L. Here, the alumina of the first support powders has far larger Pt-absorbing characteristic than that of the La-contained zirconia of the second powders, so that Pt is mainly loaded on the alumina of the first powders.

Further, the honeycomb substrate loading Rh, Ba and Pt thereon is immersed into the potassium nitrate aqueous solution and the lithium nitrate aqueous solution each having predetermined density respectively, pulled up and dried at 250 ° C., and baked at 500 ° C. in 1 hour. K and Li of 0.1 mole are respectively loaded per the honeycomb substrate of 1 L, and K and Li are loaded on the surface layer of the coated layer uniformly.

(Embodiment 10)

The catalyst of the embodiment 10 has been prepared in the same manner as that of the above embodiment 9, except that the La-contained zirconia powders containing La of 3.3 mole % has been used, instead of the above La-contained zirconia powders containing La of 1.1 mole %.

(Embodiment 11)

The catalyst of the embodiment 11 has been prepared in the same manner as that of the above embodiment 9, except that the La-contained zirconia powders containing La of 5.6 mole % has been used, instead of the above La-contained zirconia powders containing La of 1.1 mole %.

(Embodiment 12)

The catalyst of the embodiment 12 has been prepared in the same manner as that of the above embodiment 9, except that the La-contained zirconia powders containing La of 11.0 mole % has been used, instead of the above La-contained zirconia powders containing La of 1. 1 mole %.

(Comparative Sample 3)

The catalyst of the comparative sample 3 has been prepared in the same manner as that of the above embodiment 9, except that the zirconia powder of 99.5% not containing La has been used, instead of the La-contained zirconia powders containing La of 1.1 mole %.

(Test, Evaluation)

Figure 11:
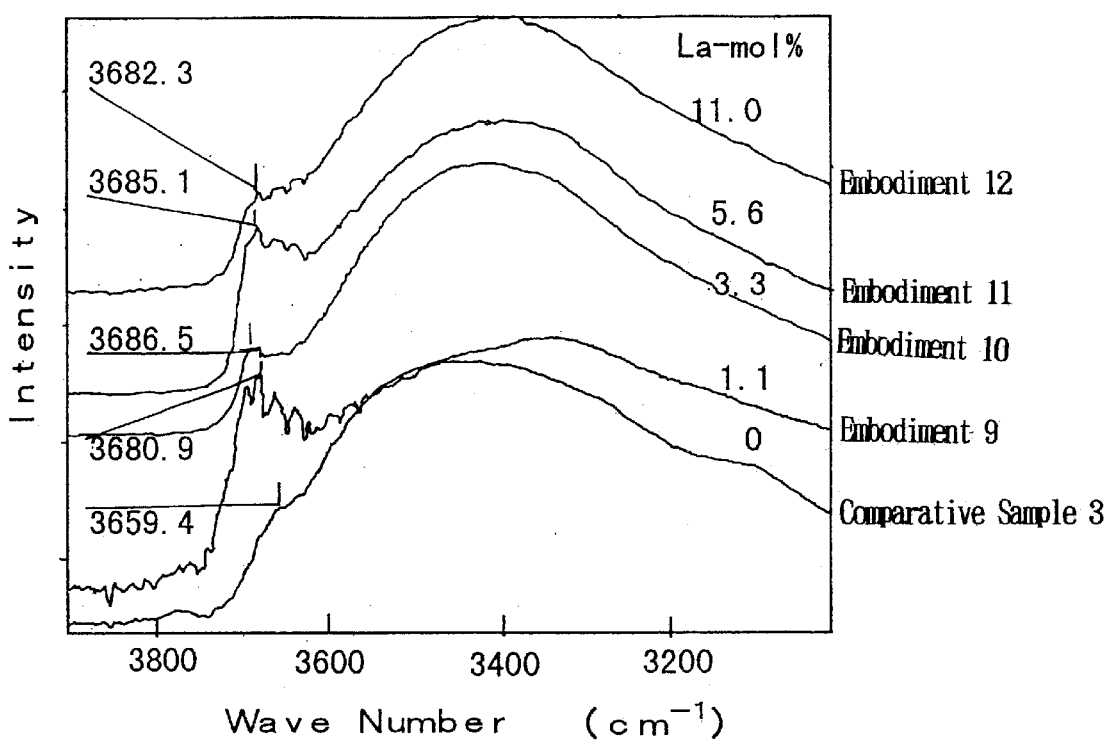
FIG. 11 is an infrared spectral analyzed chart of the zirconia powders used in the embodiments and the comparative samples.

The La-contained zirconia powders of each of the embodiments 9 to 12 and the zirconia powders of 99.5% purity of the comparative sample 3 have been subjected to the infrared spectral analysis (IR), the results of which are shown in FIG. 11.

As apparent from FIG. 11, the wave number of absorptions by the hydroxy group has shifted to the larger wave number as increase of the La-contained amount. It is confirmed the alkaline performance of hydroxy group at the surface has increased as increase of the La-contained amount. Thus, the absorbing force for the steam ($H_2O$) in the exhaust gas increases as the La-contained amount of the zirconia powders increases.

The La-contained zirconia powders used in each of the embodiments 9 to 12 and the zirconia powders of 99.5% purity used in the comparative sample 3 have been measured the specific surface thereof. Also, the specific surfaces. of them have been measured after the heat resistant test in which the zirconia powders are heated at 800° C. in 10 hours. The specific surface is measured by the BET method. The measured results are shown in FIG. 12.

Figure 12:
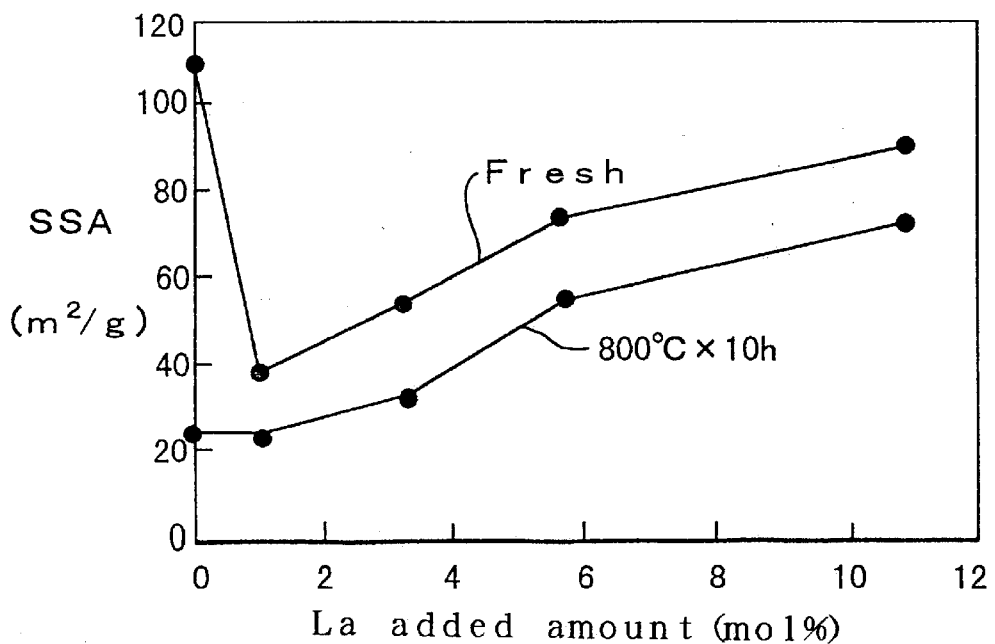
FIG. 12 is a graph showing the specific surface of the zirconia powders used in the embodiments and the comparative samples.

As apparent from FIG. 12, the specific surface after the heat resistant test has clearly increased as increase of the La-contained amount in the zirconia powders, and the decreasing degree of the specific surface after the heat resistant test has been clearly restrained by containing of La. Judging from these facts, it is confirmed degree of the surface area increase and the specific surface decrease of the zirconia having become large by large contained amount of La.

Also, the second powders used in each of the embodiments 9 to 12 and that used in the comparative sample 3 have been measured the CO-absorbed amount thereof. The CO absorbed amount of them before and after the heat resistant test carried out at 600° C. in 10 hours has been measured similarly. The results of measurements are shown in FIG. 13. Here, the CO-absorbed amount has been measured by the gas absorbing apparatus.

As apparent from FIG. 13, containing La has increased the CO absorbed amount after the heat resistant test and has restrained deterioration of Rh are confirmed.

The hydrogen created amount of the second powders used in each of the embodiments 9 to 12 and that used in the comparative sample 3 has been measured. The results of measurement are shown in FIG. 14. Here, the hydrogen created amount is measured by the gas chromatography.

As apparent from FIG. 14, it is confirmed containing La has greatly increased the hydrogen created amount and, has greatly improved the hydrogen creating activity by the steam reforming reaction by Rh.

In summary, the above tests has clearly revealed that La has been contained in the zirconia, and the loading of Rh on the La-contained zirconia has greatly improved the steam reforming reaction activity of Rh. Therefore, it is expected that using such second powders as the catalyst for purifying the exhaust gas of the present invention will not only improve the NOx purifying ability but will elongate the durability of Nox purifying ability.

The catalysts in each of the embodiments 9 to 12 and the comparative sample 3 has been installed to the gas exhausting system of 1.8 L of the lean burn engine, and subjected to the endurance test corresponding to the actual running of 50000 Km. Thereafter, in the same gas exhausting system (inputting gas temperature:400° C.), the NOx saturate occluded amount, the RS occluded amount (rich pulse (spike) 0.5 sec.), and the NOx emission in the 10–15 mode driving condition have been measured. The measured results are shown in the Table 3.

The degree of sulfur poisoning in the endurance test has been calculated by the difference of NOx purifying rate before and after the endurance test, and is shown in the Table 3 as the absolute value relative to result of the catalyst of the above comparative sample 3.

TABLE 3

|  | sulfur poisoning amount (abso. value) | NOx occluded amount (mg) | RS occluded amount (mg) | NOx emission (g/km) |
|---|---|---|---|---|
| emb. 9 | 0.72 | 311 | 230 | 0.135 |
| emb. 10 | 0.68 | 327 | 270 | 0.125 |
| emb. 11 | 0.69 | 330 | 275 | 0.122 |
| emb. 12 | 0.70 | 308 | 264 | 0.129 |
| com. 3 | 1.00 | 221 | 163 | 0.168 |

As apparent from the Table 3, in the catalysts of the embodiments 9 to 12, all of the NOx occluded amount, RS occluded amount and sulfur poisoning amount after the heat resistant test have greatly increased compared with that of the comparative sample 3. As a result, the NOx emission in the 10–15 mode has greatly decreased.

In addition, the relation between the Nox occluding ability and RS occluding ability of each of the embodiments 9 to 12 and the comparative sample 3 after the heat resistant test and the La-contained amount, is similar to the relation between the CO-absorbed amount and the La-contained amount shown in FIG. 13, and to the relation between the hydrogen created amount and the La-contained amount shown in FIG. 14. Thus, the La-contained zirconia is confirmed to greatly improve the steam reforming reaction activity of Rh.

What is claimed is:

1. A catalyst for purifying exhaust gas comprising a mixture of first powders comprising platinum (Pt) loaded on a first support made of porous particles, and second powders comprising rhodium (Rh) loaded on a second support, wherein $NO_x$ occluding material is loaded at least on the first support, and the second support is made of zirconia containing an alkaline-earth metal, wherein the alkaline-earth metal is present in an amount not more than 11.35 mole %.

2. A catalyst for purifying exhaust gas according to claim 1, wherein the alkaline-earth metal is selected from the group consisting of barium and calcium.

3. An exhaust gas purifying method for purifying exhaust gas discharged from an internal combustion engine in which fuel is combusted in condition where mixed gas of rich atmosphere containing excessive fuel is supplied to mixed gas of lean atmosphere containing excessive oxygen like a pulse, by contacting the exhaust gas with a catalyst for purifying exhaust gas comprising a mixture of first powders comprising platinum (Pt) loaded on a first support made of porous particles, and second powders comprising rhodium (Rh) loaded on a second support, wherein $NO_x$ occluding material is loaded at least on the first support, and the second support is made of zirconia containing an alkaline-earth metal, wherein the alkaline-earth metal is present in an amount not more than 11.35 mole %.

4. An exhaust gas purifying method according to claim 3, wherein the alkaline-earth metal is selected from the group consisting of barium and calcium.

5. A catalyst for purifying exhaust gas comprising a mixture of first powders comprising platinum (Pt) loaded on a first support made of porous particles, and second powders comprising rhodium (Rh) loaded on a second support, wherein $NO_x$ occluding material is loaded at least on the first support, and the second support is made of zirconia containing a rare-earth metal, wherein the rare-earth metal is present in an amount not more than 11.0 mole %.

6. A catalyst for purifying exhaust gas according to claim 5, wherein the rare-earth element is lanthanum.

7. An exhaust gas purifying method for purifying exhaust gas discharged from an internal combustion engine in which fuel is combusted in condition where mixed gas of rich atmosphere containing excessive fuel is supplied to mixed gas of lean atmosphere containing excessive oxygen like a pulse, by contacting the exhaust gas with a catalyst for purifying exhaust gas comprising a mixture of first powders comprising platinum (Pt) loaded on a first support made of porous particles, and second powders comprising rhodium (Rh) loaded on a second support, wherein $NO_x$ occluding material is loaded at least on the first support, and the second support is made of zirconia containing a rare-earth element, wherein the rare-earth metal is present in an amount not more than 11.0 mole %.

8. An exhaust gas purifying method according to claim 7, wherein the rare-earth element is lanthanum.

* * * * *